Jan. 8, 1963 D. L. CALKINS ET AL 3,072,198
DRIVE MECHANISM FOR ROD WEEDERS
Filed March 11, 1960 4 Sheets-Sheet 1

INVENTORS
Dwight L. Calkins
Morris W. Guyer
BY
atty.

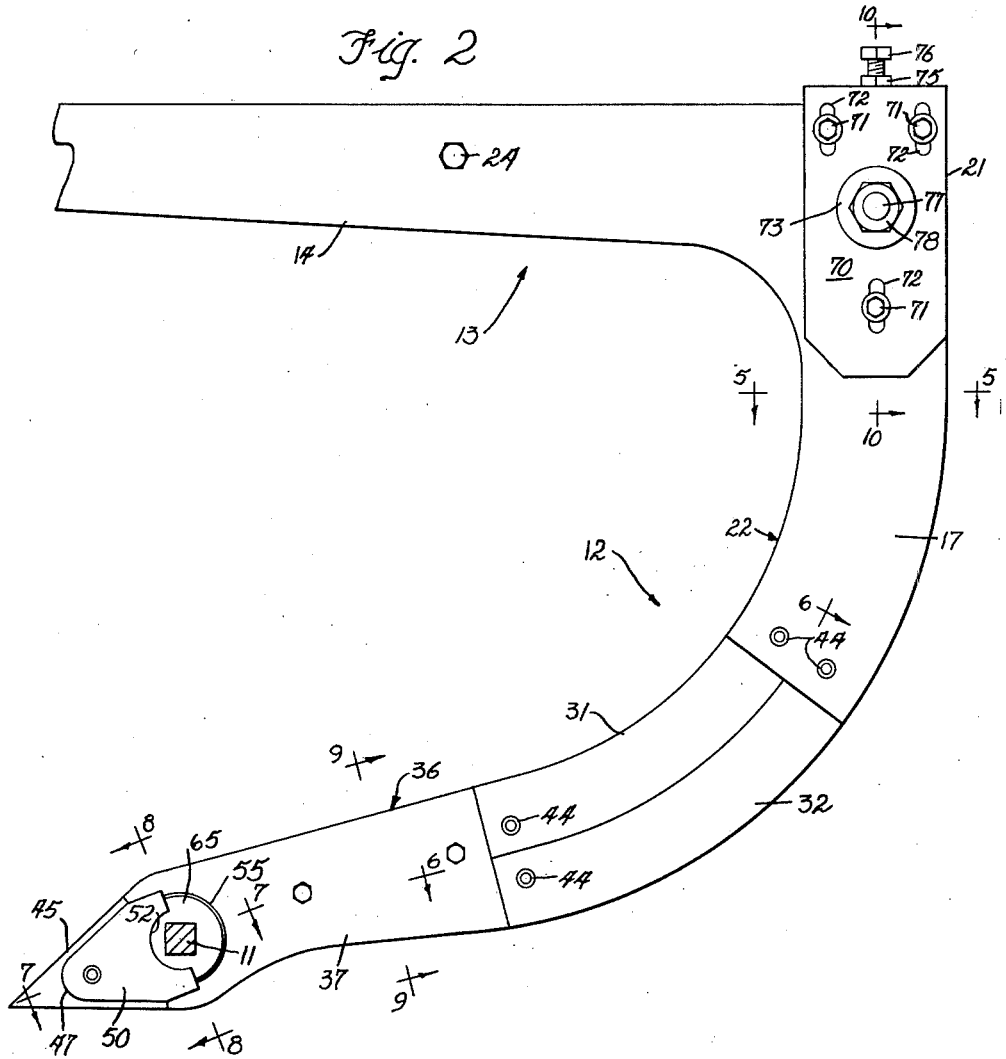
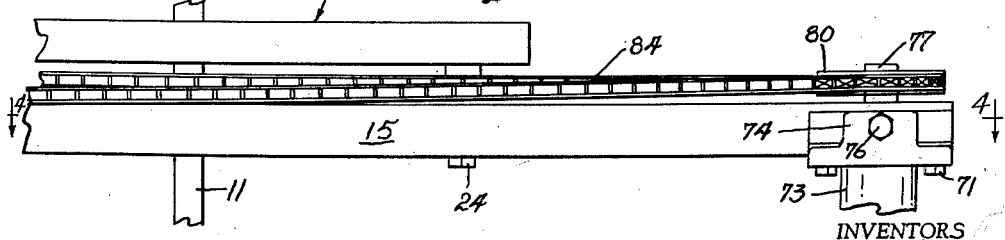

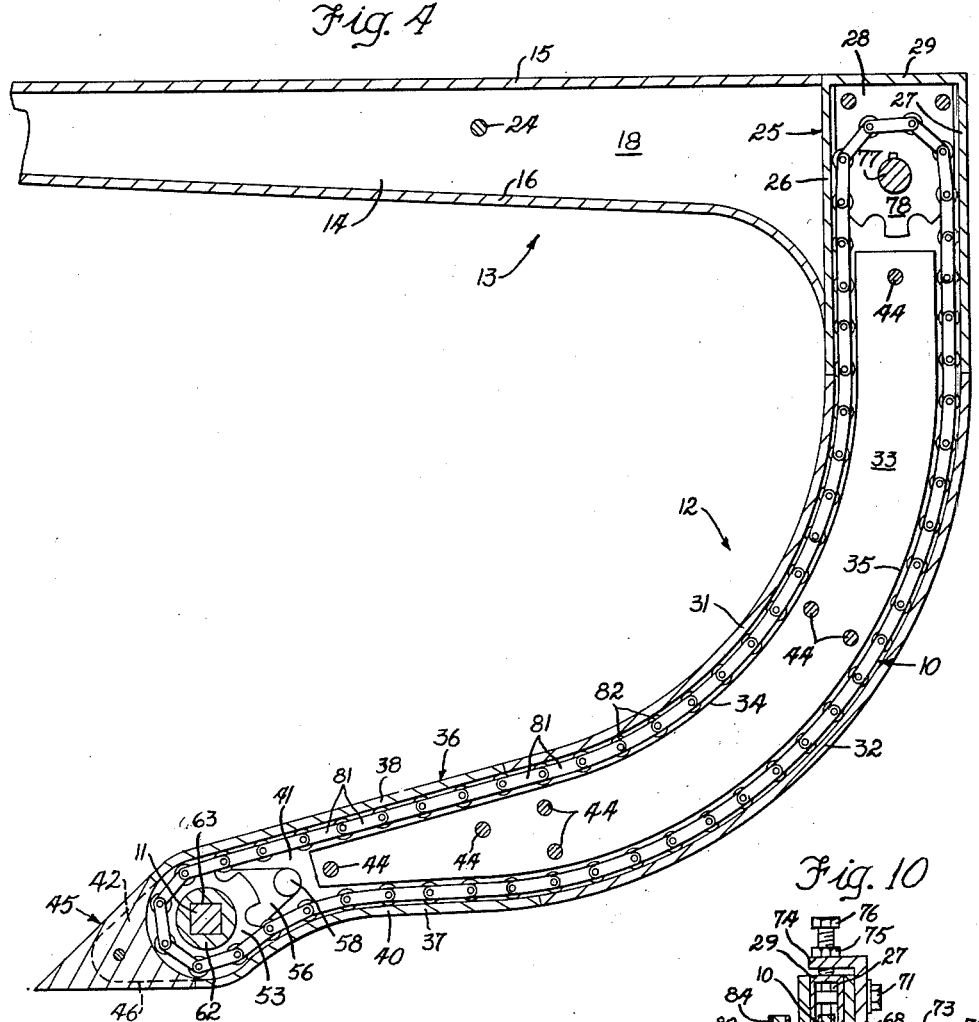
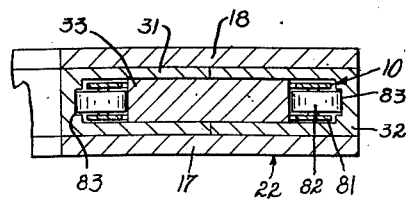
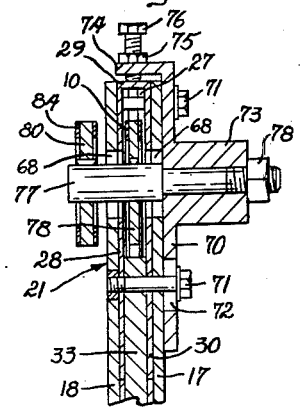
INVENTORS
Dwight L. Calkins
Morris W. Guyer
BY
atty.

Jan. 8, 1963 D. L. CALKINS ET AL 3,072,198
DRIVE MECHANISM FOR ROD WEEDERS
Filed March 11, 1960 4 Sheets-Sheet 4

INVENTORS
Dwight L. Calkins
Morris W. Guyer
BY
atty.

United States Patent Office 3,072,198
Patented Jan. 8, 1963

3,072,198
DRIVE MECHANISM FOR ROD WEEDERS
Dwight L. Calkins and Morris W. Guyer, Spokane, Wash., assignors to Calkins Manufacturing Company, Spokane, Wash.
Filed Mar. 11, 1960, Ser. No. 14,450
4 Claims. (Cl. 172—44)

This invention relates to a novel drive mechanism for rod weeders.

It has become a common practice to use a rod weeder in the preparation of a field for cultivation. In this implement, a square transverse rod is drawn through the soil directly below the soil surface and is rotated so as to uproot weeds and the like. Various mechanisms have been proposed to rotate the rod, but none has been entirely satisfactory due to the unusual requirements of such a drive. It must have high strength and be a positive drive, since the loads encountered in dense soil result in varying demands upon the power supply. It also must be maintained in a housing which will not collect weeds and which will not create a furrow along its line of entry into the ground.

It is an object of this invention to provide such a drive which is fully enclosed, using a gooseneck configuration which will not become clogged with dirt or weeds.

It is a further object of this invention to provide a drive which may rotate a long weeder rod through the use of a plurality of driving mechanisms which may be located along the rod at any desired locations.

It is another object of this invention to provide a narrow drive mechanism housed in a strong containing framework which will provide easy maintenance and accessibility to replaceable parts.

These and further objects will be evident from a study of the following specification, which describes one embodiment of my invention which has already been proven to be of high practical value. This embodiment, pictorially represented in the attached drawings, is merely exemplary of the practical possibilities of my invention, whose limits are defined by the claims following the detailed description.

In the drawings:

FIGURE 2 is a side view of the drive mechanism, with a portion of the base broken away;

FIGURE 3 is a top view of the mechanism shown in FIGURE 2;

FIGURE 4 is a sectional view taken along line 4—4 in FIGURE 3;

FIGURE 5 is a sectional view taken along line 5—5 in FIGURE 2;

FIGURE 10 is a sectional view taken along line 10—10 in FIGURE 2.

Figure 1:
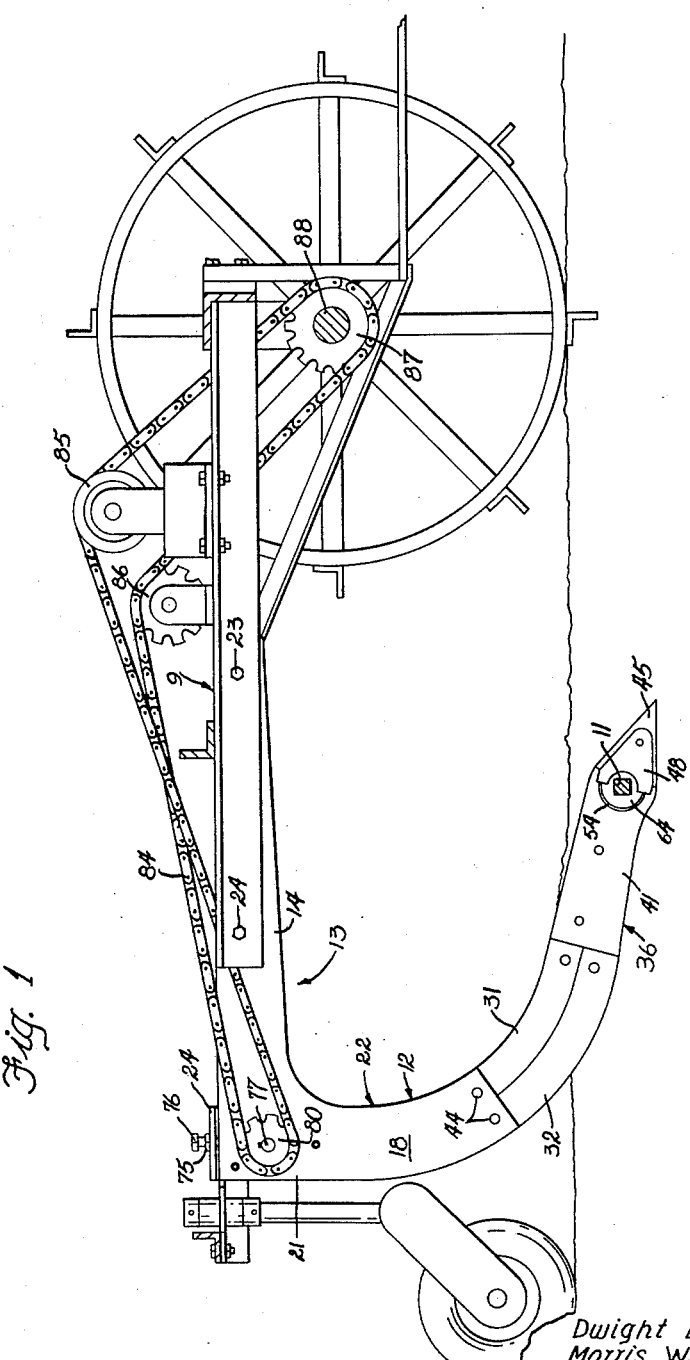
FIGURE 1 is a sectional view taken through a rod weeder equipped with the novel drive mechanism, the sectional view being taken longitudinally of the weeder and adjacent the drive mechanism.
Figure 6:
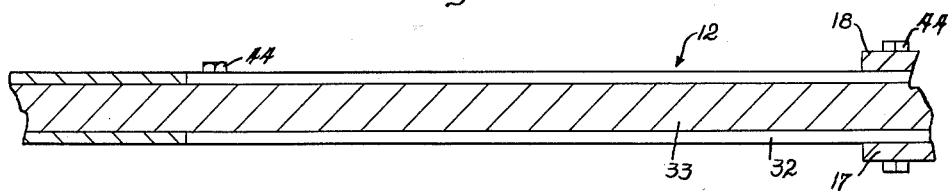
FIGURE 6 is a sectional view taken along line 6—6 in FIGURE 2.
Figure 7:
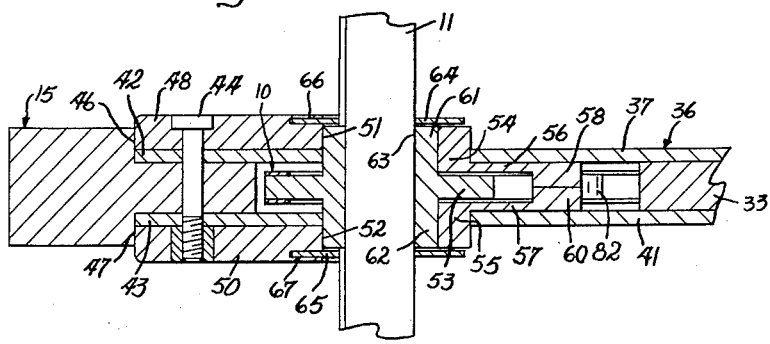
FIGURE 7 is a sectional view taken along line 7—7 in FIGURE 2.
Figure 8:
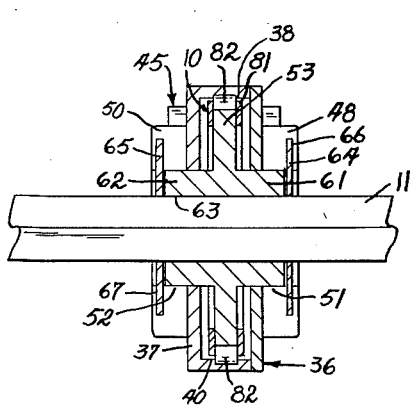
FIGURE 8 is a sectional view taken along line 8—8 in FIGURE 2.
Figure 9:
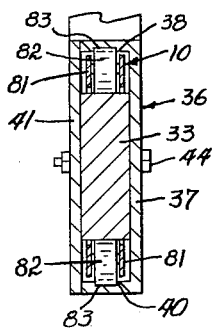
FIGURE 9 is a sectional view taken along line 9—9 in FIGURE 2.

It has been found that a gooseneck support for a rod weeder provides a strong, rigid structure upon which weeds will not normally be trapped and dragged along. Examples of such supports are shown in two prior patents granted to M. W. Guyer—Patent No. 2,862,433 granted on December 2, 1958 and Patent No. 2,776,612 granted on January 8, 1957. However, as shown in these patents, it was believed necessary to use a center drive boot extending downward to the rod in order to rotate it. This boot poses problems, since it must necessarily engage weeds and soil and must have some means of keeping itself clear of obstructions. According to this invention, the drive means is enclosed within a gooseneck structure so as to obtain all the desirable results of this arrangement and not add any obstructions to operation of the implement.

In the disclosed embodiment, a roller conveyor chain 10 is used to rotate the rectangular cross-section rod 11. Chain 10 is carried within a gooseneck structure generally denoted as 12. The rod weeder carriage frame 9 is not new and is adequately shown in Patent No. 2,862,433 cited above. According to this invention, the gooseneck structure 12 consists of an upper base support 13 which has a horizontal portion 14 enclosed by integral top and bottom spacers 15 and 16 which are fixed to side plates 17 and 18. The enclosed portion of base support 13 extends outwardly to a vertical upper portion 21 which terminates downwardly in a curved section 22. These last named portions of base support 13 are composed only of the two parallel side plates 17 and 18. The base support 13 is adapted to be secured to the rod weeder carriage frame by means of two bolt assemblies 23 and 24.

Mounted between side plates 17 and 18, at the vertical upper portion 21 of the gooseneck configuration, is a top cover 25 having a top plate 29, plus a forward track 26, and a rear track 27 fixed between a pair of vertical plates 28 and 30. Directly abutting the lower end of cover 25 are two curved channels 31 and 32. Channel 31 is an inside channel and continues the inner surface of track 26. Channel 31 is an outside channel and continues the inner surface of track 27. Fixed between the vertical plates 28 and 30 of cover 25 and also between the vertical surfaces of channels 31 and 32 is curved vertical central guide 33 which is formed with a curved inner edge 34 corresponding to the curvature of track 26 and channel 31 and a curved outer edge 35 corresponding to the curvature of track 27 and channel 32. The lower portion of guide 33 is covered by a bottom cover 36 having a first vertical side plate 37 with integral inner and outer tracks 38 and 40 extending from channels 31 and 32 respectively. A second side plate 41 corresponding in shape to plate 37 completes the assembly. At their lower terminus, tracks 38 and 40 are bent toward one another slightly. Plates 37 and 41 terminate in parallel rounded noses 42 and 43 which point slightly downward with respect to the curvature of the remainder of the assembly—hence the designation "gooseneck." It is to be noted that the various parts overlap to form a single curved housing defining two tracks for chain 10 which are separated by the central guide 33. The parts are joined by bolt and screw assemblies 44. The inner surfaces of the tracks are continuous, while the outside portions of the housing are segmented for ease in maintenance.

The lower part of the gooseneck is capped by a heavy, sharply-pointed tip 45, having a pair of rounded recesses 46, 47 into which are received the rounded noses 42 and 43 of plates 37 and 41. The noses 42 and 43 are covered by nose fairings 48 and 50 which have rounded outer surfaces and are fixed to noses 42 and 43 and tip 45 by means of a flush bolt assembly 58.

The nose fairings 48 and 50 include semi-circular bearing recesses 51 and 52, respectively, which are the forward half of the bearings for the lower sprocket 53. The rear half of the bearings are formed as semi-circular enlarged portions 54 and 55 on a pair of spacers 56 and 57, respectively, which are mounted between the plates 37 and 41. The spacers 56 and 57 are held apart by inner raised areas 58 and 60 respectively. The space between spacers 56 and 57 is occupied by sprocket 53 which has outer bearing axles 61 and 62 received by bearing recesses 51, 54 and 52, 55 respectively. A lateral aperture 63 is square in cross-section and receives the weeder rod 11 in the normal fashion. A pair of circular flat washers 64, 65, one of which is mounted at each end of the bearing axles 61 and 62, are received in semicircular forward slots 66, 67 cut into the bearing recesses 51, 52 of fairings 48 and 50. These washers 64, 65 protect the bearing surfaces from soil and foreign matter.

The upper sprocket assembly is received through vertical slots 68 which are cut through the side plates 17 and 18 of base support 13 and plates 28 and 30 of top cover 25. An adjustable plate 70 is mounted on the outer surface of side plate 17 by means of three screws 71 received in plate 17 and extending through vertical slots 72 cut through plate 70. A bearing extension 73 is aligned with slots 68 and extends outwardly from plate 70. The top of plate 70 is bent to form a horizontal portion 74 which has a threaded extension 75. A bolt 76 is threadably received through the threaded extension 75 and serves to vertically position the bearing extension 73 by bearing against the top plate 26 of the cover 25.

A sprocket shaft 77 is rotatably journalled by the bearing extension 73 and is capped by a nut 78 threadably engaged at its outer end. Shaft 77 has a sprocket 78 keyed to it within cover 25 and a second identical sprocket 80 keyed to it adjacent to the outer surface of side plate 18. Sprocket 78 carries chain 10.

Chain 10 is preferably formed of connected links 81, between which are journalled a series of enlarged rollers 82. In order to prevent the chain from wearing along its sides, the inner and outer tracks are grooved to a slight depth as shown at 83. This groove 83 serves to center the chain 10 and maintains it for long life. The slack in chain 10 is easily adjusted by use of bolt 76, which serves to move and position the upper chain sprocket 78.

The outer sprocket 80 is driven by a figure eight chain drive consisting of a chain 84 mounted on the above-described sprocket 80, two idler sprockets 85, 86 which are mounted on the rod weeder carriage frame 9, and a driving sprocket 87 secured to the axle 88 for the main support wheels. This type of drive is well known and serves to reverse the rotation of sprocket 80 with respect to the direction of rotation of sprocket 87. This results in the rod 11 being turned in an upward direction at its forward surface to best churn up the weeds and roots as it is dragged along.

The use of the invention is illustrated in FIGURE 1. In use, the rod 11 is lowered by conventional means. Pointed tip 45 will then dig into the ground a predetermined distance limited by the lowering means. Normally this will be quite shallow. The ground surface will be cut by the gradually receding portion of the gooseneck, which will not collect weeds due to its slight vertical elevation. The weeds will gradually fall from this incline before encountering the more steeply inclined upper section. This arrangement prevents fouling of the drive. If desired, relief may be provided on the underside of the drive housing to allow moisture and dirt to escape. However, such relief is not necessary in all applications. Likewise, sealed bearings may be utilized if desired to mount the sprockets.

It is obvious that with this drive mechanism, it is no longer necessary to limit the drive to a central support. In larger rigs, two such gooseneck drives could be used—one being mounted at each end of the rod. In extremely long rigs, any desired number of such drives can be utilized, thus providing rod weeders of a width never before possible.

The important feature is the adaptation of a gooseneck form to the drive mechanism for the rod 11. Since the forward portion of the chain is the working flight of the drive, it is the use of a roller chain 10, which can ride along the curvature of the gooseneck, that makes the invention practicable. This basic feature is the core of the invention and solves a problem which has been posed ever since gooseneck supports were proven to be so effective as support bearings for the rotating rod. The construction of the housing may be varied to suit the individual requirements of the user, so long as the basic drive of this invention remains intact. Such variations are contemplated within the limits of this invention as defined in the following claims.

Having thus described my invention, I claim:

1. In a rotary rod weeder including a carriage frame, a drive mechanism comprising a narrow housing having a horizontal upper portion secured to said carriage frame, said housing embodying parallel vertical plates curved downwardly and forwardly from the rear end of said horizontal upper portion, and a curved front wall enclosing the space between said vertical sides, a sharp point extending forwardly from the lower terminus of said housing and secured thereto, a first sprocket journalled within the lower end of said housing, a weeding rod extending through the first sprocket and adapted to be turned thereby, a second sprocket journalled within the upper portion of said housing, roller chain means operatively connecting said first and second sprockets, the rollers of said roller chain means projecting outwardly beyond the connecting chain links, the working flight of said roller chain means extending along the inner surface of said curved front wall in engagement therewith, and means adapted to drive said roller chain means upwardly along the inner surface of said front wall.

2. In a rotary rod weeder including a carriage frame, a drive mechanism comprising a narrow enclosed housing having an upper portion secured to said carriage frame, said housing curving downwardly and forwardly from said upper portion, the lower end of said housing forming an acute angle below the horizontal, a first sprocket rotatably mounted within said housing at its lower end, a weeder rod extending through said first sprocket and adapted to be turned thereby, a second sprocket rotatably mounted within the upper portion of said housing, flexible roller chain means operatively connected to said first and second sprockets, the rollers of said roller chain means projecting outwardly beyond the connecting chain links, guide means mounted along the forward edge of said housing adapted to be abutted by the rollers of said roller chain means to thereby maintain the forward flight of said flexible sprocket chain means within said housing, and means operatively connected to said second sprocket adapted to drive the forward flight of said flexible sprocket chain means upwardly against said guide means.

3. In a rotary rod weeder including a carriage frame, a drive mechanism comprising a transversely narrow enclosed housing having a horizontal upper portion secured to said carriage frame and a curved portion extending downwardly and forwardly from the rear end of said upper portion in a gooseneck configuration, the lower end of said housing defining an acute angle below the horizontal, a curved front wall mounted along the forward edge of the curved portion of said housing, a guide having curved front and rear surfaces fixed within the housing, the front surface of said guide being equidistantly spaced from said curved front wall, first sprocket means rotatably mounted in said housing at the lower end thereof, second sprocket means rotatably journalled in said housing at the rear end of the upper portion thereof, roller chain means entrained about said first and second sprocket means and being adapted to rotate said first sprocket in response to movement of said chain means, said chain means including a plurality of longitudinally spaced rollers mounted on connecting side links, the rollers projecting outwardly beyond the links, the rollers of the forward flight of said chain means being in rolling engagement with the curved inner surface of said curved front wall intermediate said front wall and said guide, and the rollers of the rear flight of said chain means being in rolling engagement with the rear surface of said guide, and means operatively connected to the second sprocket means adapted to longitudinally pull the forward flight of said chain means in an upward direction against the inner surface of said curved front wall.

4. The device as defined in claim 3 wherein the curved front wall of said housing is longitudinally grooved along its inner surface, the groove width being substantially the width of the rollers to thereby enable the rollers to be transversely positioned within the groove.

References Cited in the file of this patent

UNITED STATES PATENTS

| | | |
|---|---|---|
| 214,072 | Whittemore | Apr. 8, 1879 |
| 1,176,883 | Crawford | Mar. 28, 1916 |
| 2,318,097 | Richmond | May 4, 1943 |
| 2,862,433 | Guyer | Dec. 2, 1958 |
| 2,892,504 | Mowbray | June 30, 1959 |